Sept. 6, 1938.   W. T. HANCOCK   2,129,174
OIL CRACKING TUBE LINING
Filed March 4, 1935
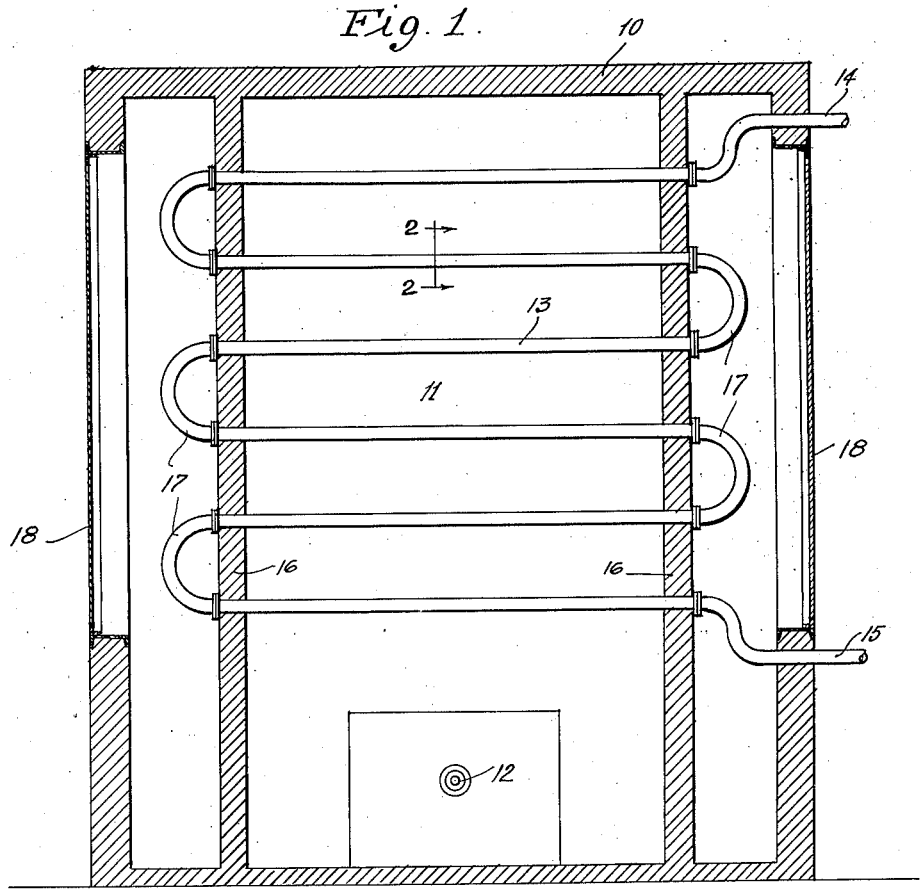
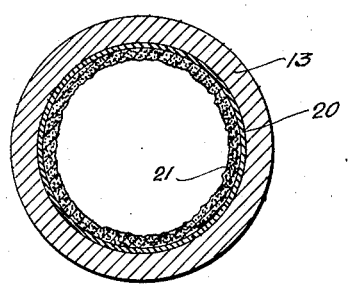
Inventor
William T. Hancock
Attorney.

Patented Sept. 6, 1938

2,129,174

UNITED STATES PATENT OFFICE 2,129,174

OIL CRACKING TUBE LINING

William T. Hancock, Long Beach, Calif.

Application March 4, 1935, Serial No. 9,143

1 Claim. (Cl. 196—133)

This invention has for its principal object to reduce and to a large extent overcome certain difficulties resulting from the deposition of hard carbon layers on the inside walls of oil cracking tubes, and from the extremely strong bond formed between the carbon layer and the wall of the tube at the high cracking temperatures.

In oil cracking tube stills, particularly those operating at extremely high temperatures and pressures, carbon formed as a result of the cracking reactions deposits on the walls of the tubes. And in many cases, depending upon operating conditions and the character of the cracking stock, the carbon layer builds up so rapidly that in a comparatively short time the effective area of the tubes and their effective heat conductivity are reduced to the extent of necessitating frequent shut-downs in order that the carbon may be reamed or otherwise removed from the tubes. Generally the carbon layer is very hard, and the bond between the carbon particles correspondingly strong. Also, carbon seems to have a marked affinity to the cracking tube steel at the existent high temperatures, and the result is that an extremely hard bond is formed between the carbon layer and the wall of the tube, giving rise to great difficulties in dislodging and shearing the carbon from the steel in reaming operations. Also, the strength of the carbon-to-steel bond, and the tendency for carbon to deposit on the tube wall, are to a considerable extent increased by the presence of irregularities in the surface of the tube, the reason for which is believed fully apparent.

Generally speaking, my main object is threefold: First, to prevent carbon from bonding directly to the wall of the tube; second, to effect an indirect bond between the carbon and the wall of the tube that will be comparatively weak, or substantially weaker than a direct bond between the carbon and steel formed under corresponding temperature conditions; and third, to cover or fill any surface irregularities that may be present in the wall of the tube. These objects are accomplished by applying to the interior surface of the tube a lining upon which the carbon will deposit and which, as a result of its physical characteristics and the elimination of the carbon-to-steel bond, retards the depositing of carbon and greatly facilitates removal of the carbon layer from the tube. In this particular regard, one result of the lining is to so weaken the bond between the carbon layer and steel that a reamer will without difficulty cleanly shear the carbon from the tube and consequently remove the carbon layer from the entire tube in much less time than is ordinarily required.

Different substances may be used for the lining, providing they possess properties and characteristics capable of giving the results outlined above, or at least some of the properties of certain typical materials more particularly described hereinafter. Generally speaking, I prefer to use a material that is considerably softer than the tube steel, and most advantageously one that has low strength or that forms a bond, either with the carbon or tube wall, sufficiently weak to be broken or sheared. For convenience of application, I prefer to use an initially fluid or semifluid material that can be spread on the wall of the tube, by an inserted swab or other implement, before the still is put into operation and after each time the tubes are reamed.

The invention will be more specifically explained in the detailed description to follow, and throughout which reference is made to the accompanying drawing, in which:

Fig. 1 is a sectional view typifying the usual oil cracking tube still; and

Fig. 2 is an enlarged cross-sectional view of one of the tubes showing the interior lining.

In a typical oil cracking still, as illustrated in Fig. 1, the walls 10 enclose an interior chamber 11 which is heated to high temperatures by combustion gases rising from the burner 12. Charging stock fed to the bank of cracking tubes 13 through inlet line 14 flows downwardly through the tubes and is discharged through outlet line 15, thence to be further treated. In passing through the tubes, the oil may be heated to usual cracking temperatures ranging from say 700 to 1100° F., and under pressures as high as several hundred lbs. per sq. in. The tubes are mounted on supports 16, the ends of the tubes extending through the supports and being connected in series by return bends 17. After the still has been in operation for such time that excessive carbon, resulting from the cracking reaction, has become deposited within the tubes, the return bends 17 may be removed and the carbon reamed out of the tubes. Access is had to the return bends and the horizontal sections of the tubes for the purpose of reaming operations, by opening doors 18 at the ends of the tube bank.

While return bends 17 are removed, and before the still is initially put into operation or after carbon deposits have been reamed from the tubes, the lining substance, generally described above, is applied to the inner surfaces of the tubes. My preferred tube coating will comprise flaky graphite, which is a solid lubricant by reason of the flaky structure, as the primary or effective ingredient, together with a suitable inorganic or organic binder, the purpose of which is to initially give the coating substance a consistency sufficiently fluid that it can be spread over the inner surface of the tubes in a thin layer or film, and which will have sufficient bonding qualities to cause the graphite to adhere to the tubes during the circulation of oil through them, or until a surface layer of precipitated carbon builds up on the coating. It is immaterial that the binder or graphite carrier may become carbonized or otherwise changed as a result of the high temperatures to which the tubes are heated, so long as it serves the purpose of causing the graphite to adhere to the wall of the tube.

In Fig. 2 I show the lining in the form of a comparatively thin layer 20 applied to the inner surface of the tube 13. The coating substance may consist typically of flaky graphite mixed with any one or combination of the following substances as carriers for the graphite, and in such proportion as to render the coating fluid or at least freely plastic for the purpose of application to the tube; saponified or calcium soaps; molasses, coumar indene, lard oil, degras or saponified degras, vinyl compounds, vinyl or other resins, or pigment carriers of the general type commonly used in some of the heat resistant paints. As previously mentioned, at the high temperatures existent in the cracking tubes, the graphite carrier may carbonize, but nevertheless the graphite will remain bonded to the tube.

The lining 20, though carbonaceous, will be softer than the carbon layer 21 deposited on it as a result of oil cracking, and will serve as a comparatively weak bond between this precipitated carbon layer and the tube so that the former may be readily severed by the reamer in cleaning operations.

After return bends 17 have been removed and the inner surfaces of the tubes cleaned, the coating 20 may be applied in any suitable manner as by means of a swab inserted in the tubes. In its fluid condition, the coating will of course fill any cavities or irregularities in the wall of the tube. If desired, the coating may be set preliminary to the passage of oil through the tubes, by first heating the tubes to 200 or 300° F., and then, after the graphite carrier has become volatilized sufficiently to set the coating to a certain extent, oil may be introduced to the tubes and the temperatures raised as required for cracking operations.

I claim:

In oil cracking apparatus, the combination comprising an externally heated metal wall enclosing a space within which oil is subjected to cracking with resultant carbon formation in said space, and a prepared lining applied to the inner surface of said wall and directly exposed to said space, said lining including graphite particles and a binder for said particles, and being adapted to be sheared to remove a carbon layer deposited thereon.

WILLIAM T. HANCOCK.